United States Patent
Lee et al.

(10) Patent No.: US 9,313,407 B2
(45) Date of Patent: Apr. 12, 2016

(54) ELECTRONIC APPARATUS, METHOD FOR CONTROLLING THE SAME, AND COMPUTER-READABLE RECORDING MEDIUM

(71) Applicant: SAMSUNG ELECTRONICS CO., LTD., Suwon-si, Gyeonggi-do (KR)

(72) Inventors: Seung-yun Lee, Hwaseong-si (KR); Byoung-woo Kim, Seoul (KR); Joon-ho Youn, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/141,896

(22) Filed: Dec. 27, 2013

(65) Prior Publication Data

US 2014/0211037 A1    Jul. 31, 2014

(30) Foreign Application Priority Data

Jan. 29, 2013  (KR) ......................... 10-2013-0010103

(51) Int. Cl.
*H04N 5/232*    (2006.01)

(52) U.S. Cl.
CPC ........... *H04N 5/23293* (2013.01); *H04N 5/232* (2013.01); *H04N 5/23229* (2013.01)

(58) Field of Classification Search
CPC ....................... H04N 5/23293; H04N 5/23229
USPC ........................................ 348/333.01–333.13
See application file for complete search history.

(56) References Cited

U.S. PATENT DOCUMENTS

| | | | |
|---|---|---|---|
| 2003/0052985 A1* | 3/2003 | Oya et al. | 348/333.02 |
| 2003/0076312 A1* | 4/2003 | Yokoyama | 345/204 |
| 2004/0201699 A1* | 10/2004 | Parulski et al. | 348/207.99 |
| 2007/0019097 A1* | 1/2007 | Fukui | 348/333.01 |
| 2007/0188647 A1* | 8/2007 | Ikeda | 348/333.11 |
| 2008/0074499 A1* | 3/2008 | Niimura | 348/207.1 |
| 2009/0160969 A1* | 6/2009 | Kuroiwa | 348/223.1 |
| 2012/0293611 A1 | 11/2012 | Lee | |

FOREIGN PATENT DOCUMENTS

KR    10-2012-0128441 A    11/2012

* cited by examiner

*Primary Examiner* — Christopher K Peterson
(74) *Attorney, Agent, or Firm* — Drinker Biddle & Reath LLP

(57) ABSTRACT

An electronic apparatus includes a photographing unit, a processing unit, and a display unit. The photographing unit creates an image signal and captures a first image corresponding to a first shutter release signal. The processing unit creates a first quick view image of the first captured image and creates a live view image based on the image signal. The display unit displays the first quick view image and the live view image. If a second shutter release signal is inputted within a first reference time from a moment at which the first shutter release signal is inputted, the processing unit creates and displays, at the display unit, a second quick view image corresponding to the second shutter release signal. If the second shutter release signal is not inputted within the first reference time, the processing unit creates and displays, at the display unit, the live view image.

18 Claims, 5 Drawing Sheets

ELECTRONIC APPARATUS, METHOD FOR CONTROLLING THE SAME, AND COMPUTER-READABLE RECORDING MEDIUM

CROSS-REFERENCE TO RELATED PATENT APPLICATION

This application claims the priority benefit under 35 U.S.C. §119(a) from Korean Patent Application No. 10-2013-0010103, filed on Jan. 29, 2013, in the Korean Intellectual Property Office, the disclosure of which is incorporated herein in its entirety by reference.

BACKGROUND

1. Field

The embodiments described herein relate to an electronic apparatus, a method for controlling the electronic apparatus, and a computer-readable recording medium having recorded thereon computer program codes to execute the method for controlling the electronic apparatus.

2. Related Art

An electronic apparatus configured for photographing receives incident light through a lens, aperture, and the like to form an image on an imaging device, converts the light into electricity, thereby photographing an object. The electronic apparatus exposes the imaging device to light according to a shutter release signal in order to take an image. The image that has been taken goes through a series of processes and is stored in a storage unit. Since a series of processes are required after photographing, it takes time for the electronic apparatus to take a next image.

SUMMARY

Various embodiments of the present disclosure provide a reduction in time between capturing a second image after taking a first image.

According to one embodiment, an electronic apparatus includes a photographing unit, a processing unit, and a display unit. The photographing unit converts incident light into electricity to create an image signal, and captures a first image corresponding to a first shutter release signal. The processing unit creates a first quick view image of the first captured image and creates a live view image based on the image signal created by the photographing unit. The display unit displays the first quick view image and the live view image. If a second shutter release signal is inputted within a first reference time from a moment at which the first shutter release signal is inputted, the processing unit creates a second quick view image corresponding to the second shutter release signal and displays the second quick view image at the display unit. If the second shutter release signal is not inputted within the first reference time from the moment at which the first shutter release signal is inputted, the processing unit creates the live view image and displays the live view image at the display unit.

The processing unit may include a quick view creation unit and a captured image post-processing unit. The quick view creation unit may create the first quick view image corresponding to the first shutter release signal. The captured image post-processing unit may encode the first captured image corresponding to the first shutter release signal after completion of the creating of the first quick view image corresponding to the first release signal, if the second shutter release signal is inputted within the first reference time. The quick view creation unit may display the first quick view image corresponding to the first shutter release signal at the display unit while the first captured image is being encoded. The quick view creation unit may create a second quick view image corresponding to the second shutter release signal after completion of the encoding of the first captured image corresponding to the first shutter release signal.

The processing unit may further include a photograph setting control unit which automatically controls one or more photograph setting values based on a subject matter, after completion of the creating of the first quick view image corresponding to the first shutter release signal, if the second shutter release signal is inputted within the first reference time.

The quick view creation unit may create the second quick view image corresponding to the second shutter release signal, after completion of the encoding of the first captured image corresponding to the first shutter release signal and completion of the controlling of the one or more photograph setting values.

The processing unit may further include a user interface control unit which sets a user interface to a locked mode while the photographing unit is capturing a second image corresponding to the second shutter release signal.

The captured image post-processing unit may save the first captured image corresponding to the first shutter release signal, after completion of the creating of the first quick view image corresponding to the first shutter release signal, if the second shutter release signal is inputted within the first reference time.

According to another embodiment, a method for controlling an electronic apparatus is described. A first image corresponding to a first shutter release signal is captured. A first quick view image of the first captured image corresponding to the first shutter release signal is displayed. A second quick view image of a second image captured corresponding to a second release signal is displayed, if the second shutter release signal is inputted within a first reference time from a moment at which the first shutter release signal is inputted. A live view image is displayed, if the second shutter release signal is not inputted within the first reference time from the moment at which the first shutter release signal is inputted.

The method for controlling the electronic apparatus may further include: creating the first quick view image corresponding to the first shutter release signal; encoding the first captured image corresponding to the first shutter release signal after completion of the creating of the first quick view image corresponding to the first shutter release signal, if the second shutter release signal is inputted within the first reference time; displaying the first quick view corresponding to the first shutter release signal, while the encoding of the first captured image is in operation; and creating the second quick view image corresponding to the second shutter release signal after completion of the encoding of the first captured image corresponding to the first shutter release signal.

The method for controlling the electronic apparatus may further include automatically controlling one or more photograph setting values, based on a subject matter, in parallel with the encoding of the first captured image, after completion of the creating of the first quick view image corresponding to the first shutter release signal, if the second shutter release signal is inputted within the first reference time.

The method for controlling the electronic apparatus may further include creating a second quick view image corresponding to the second shutter release signal, after completion of the encoding of the first captured image corresponding to the first shutter release signal and completion of the controlling of the one or more photograph setting values.

The method for controlling the electronic apparatus may further include setting a user interface to a locked mode while the first captured image corresponding to the shutter release signal is being captured.

The method for controlling the electronic apparatus may further include saving the first encoded captured image corresponding to the first shutter release signal, after completion of the creating of the first quick view image corresponding to the first shutter release signal, if the second shutter release signal is inputted within the first reference time.

According to another embodiment, a non-transitory computer-readable recording medium is described, having stored thereon computer program codes, which when executed by a process, perform a method for controlling an electronic apparatus. The electronic apparatus captures images corresponding to shutter release signals. The method for controlling the electronic apparatus includes: capturing a first image corresponding to a first shutter release signal; displaying a first quick view image of the first captured image corresponding to the first release signal; displaying a second quick view image of a second captured image corresponding to a second shutter release signal, if the second shutter release signal is inputted within a first reference time from a moment at which the first shutter release signal is inputted; and displaying a live view image, if the second shutter release signal is not inputted within the first reference time from the moment at which the first shutter release signal is inputted.

The method, stored on the non-transitory computer-readable recording medium, for controlling the electronic apparatus may further include: creating the first quick view image corresponding to the first shutter release signal; encoding the first captured image corresponding to the first shutter release signal after completion of the creating of the first quick view image corresponding to the first shutter release signal, if the second shutter release signal is inputted within the first reference time; displaying the first quick view corresponding to the first shutter release signal, while the encoding of the first captured image is in operation; and creating the second quick view image corresponding to the second shutter release signal after completion of the encoding of the first captured image corresponding to the first shutter release signal.

The method, stored on the non-transitory computer-readable recording medium, for controlling the electronic apparatus may further include automatically controlling one or more photograph setting values, based on a subject matter, in parallel with the encoding of the first captured image, after completion of the creating of the first quick view image corresponding to the first shutter release signal, if the second shutter release signal is inputted within the first reference time.

The method, stored on the non-transitory computer-readable recording medium, for controlling the electronic apparatus may further include creating a second quick view image corresponding to the second shutter release signal, after completion of the encoding of the first captured image corresponding to the first shutter release signal and completion of the controlling of the one or more photograph setting values.

The method, stored on the non-transitory computer-readable recording medium, for controlling the electronic apparatus may further include setting a user interface to a locked mode while the first captured image corresponding to the shutter release signal is being captured.

The method, stored on the non-transitory computer-readable recording medium, for controlling the electronic apparatus may further include saving the first encoded captured image corresponding to the first shutter release signal, after completion of the creating of the first quick view image corresponding to the first shutter release signal, if the second shutter release signal is inputted within the first reference time.

According to various embodiments, a reduction in time between taking a second image after capturing a first image is provided.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Various embodiments will now be described more fully with reference to the accompanying drawings, in which exemplary embodiments are shown. The following description and the attached drawings are provided to help understanding how the various embodiments operate and portions that may be known easily among those skilled in the art may be omitted. As used herein, the term "and/or" includes any and all combinations of one or more of the associated listed items.

Also, the various embodiments disclosed herein do not limit the invention; instead, the scope of the invention has to be decided according to the scope of claims. Terms used in this specification are to be interpreted of their meanings and definitions to be corresponding most appropriately to the spirit of the invention.

The various embodiments will be described below with reference to the attached drawings.

Figure 1:
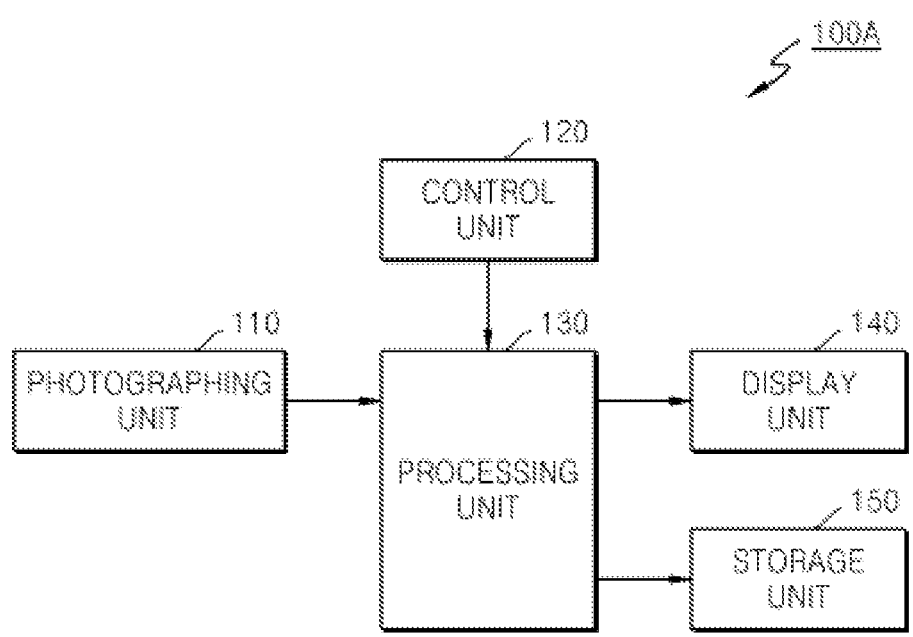
FIG. 1 is a block diagram illustrating a structure of an electronic apparatus with a photographing unit, according to an embodiment.

FIG. 1 is a block diagram illustrating a structure of an electronic apparatus 100A according to an embodiment. According to the present embodiment, the electronic apparatus 100A includes a photographing unit 110, a control unit 120, a processing unit 130, a display unit 140, and a storage unit 150.

The photographing unit 110 converts incident light into electricity, via photoelectric conversion, to thereby create an image signal from the incident light. The photographing unit 110 includes a lens (not shown), an aperture (not shown), a shutter (not shown) and an imaging device (not shown). The photographing unit 110 focuses the incident light onto the imaging device, and uses the imaging device to convert the light into electricity and thus creates the image signal.

Once having received a shutter release signal through the control unit 120, the photographing unit 110 captures an image. In order to capture an image, the photographing unit 110 first shuts out the incident light from the imaging device, then opens the shutter to expose the imaging device to the light only for a fixed amount of time, and finally captures an image and creates a captured image. The photographing unit 110 also outputs a substantially real-time image signal to the processing unit 130; the photographing unit 110 provides the real-time image signal to the processing unit 130 to create a live-view image.

Furthermore, in order to photograph, the photographing unit 110 operates the lens, the aperture, the shutter, the imaging device, and the like, under the control of the processing unit 130. The lens, the aperture, the shutter, the imaging device, and the like may be operated based on one or more preset photograph setting values.

The control unit 120 is where a user inputs a control signal. The control unit 120 may include various function buttons such as: a shutter release button to input the shutter release signal in order to expose the imaging device to the light for a fixed amount of time and photograph; a power button to input a control signal for on/off states of the electronic apparatus 100A; a zoom button to increase or decrease a viewing angle; a mode selection button; or other setting adjustment buttons. The control unit 120 may be provided in different forms such as a button, a keyboard, a touchpad, a touch screen, a remote control or any others through which a user may input the control signal.

When the user presses the shutter release button provided on the control unit 120, a shutter release signal is created. The shutter release button may have two different states: a half-pressed state and a full-pressed state. If the user half-presses the shutter release button, a signal S1 may be created; if the user full-presses the shutter release button, the shutter release signal (e.g., a signal S2) may be created.

The processing unit 130 controls the overall operation of the electronic apparatus 100A. The processing unit 130 controls operations of the photographing unit 110, the control unit 120, the display unit 140, and the storage unit 150. The processing unit 130 also executes a process on the captured image according to the image signal outputted from the photographing unit 110, and creates and stores an image file corresponding to the captured image.

The processing unit 130 creates a quick view image of a captured image after the captured image has been outputted, and shows the captured image on the display unit 140. The quick view image is an image that is shown to the user for a predetermined period of time so that the user may check the captured image immediately or shortly after its capture. Before showing the quick view image, the processing unit 130 executes one or more processes on the captured image such as a noise reducing process or resolution adjusting process.

The processing unit 130 also creates a live view image based on the real-time image signal outputted from the photographing unit 110, and shows the live view image on the display unit 140. The live view image is a substantially real-time image of what is being photographed at a predetermined frame rate. With the live view image on the display unit 140, there may be further provided one or more current photograph setting values, auto focusing (AF) status, and an on screen display (OSD) that shows information such as an electronic apparatus condition, etc.

Once the shutter release signal has been inputted, the processing unit 130 first shows the quick view image corresponding to the shutter release signal for a predetermined period of time, and then displays the live view image and OSD information. While the live view image is being displayed, the electronic apparatus 100A is ready to take a new image when a shutter release signal is inputted again.

According to the present embodiment, a first image is photographed corresponding to a first shutter release signal and then a first quick view image is displayed. If a second shutter release signal is inputted within a first reference time after the first quick view image is displayed, a live view image display is skipped. Instead, a second image corresponding to the second shutter release signal may be photographed, and a second quick view image corresponding to the second shutter release signal may be displayed. In other words, after the first quick view image corresponding to the first shutter release signal is presented on the display unit 140 of the electronic apparatus 100A, the second quick view image corresponding to the second shutter release signal is displayed. As such, the present embodiment effectively reduces a time for the electronic apparatus 100A to get ready for a next photographing (e.g., of the second image) after photographing the first image.

The display unit 140 may provide visual and/or aural information such as the quick view image, the live view image, and the OSD information to the user. In order to provide visual information, the display unit 140 may include, for example, a liquid-crystal display (LCD) panel or an organic light emitting display (OLED) panel, etc. The display unit 140 may also be a touch screen which can sense an input by touch.

The storage unit 150 stores the photographed image. The storage unit 150 may be provided as, for example, a memory card or a hard disk drive, etc. The storage unit 150 may also be permanently attached or otherwise removable.

Figure 2:
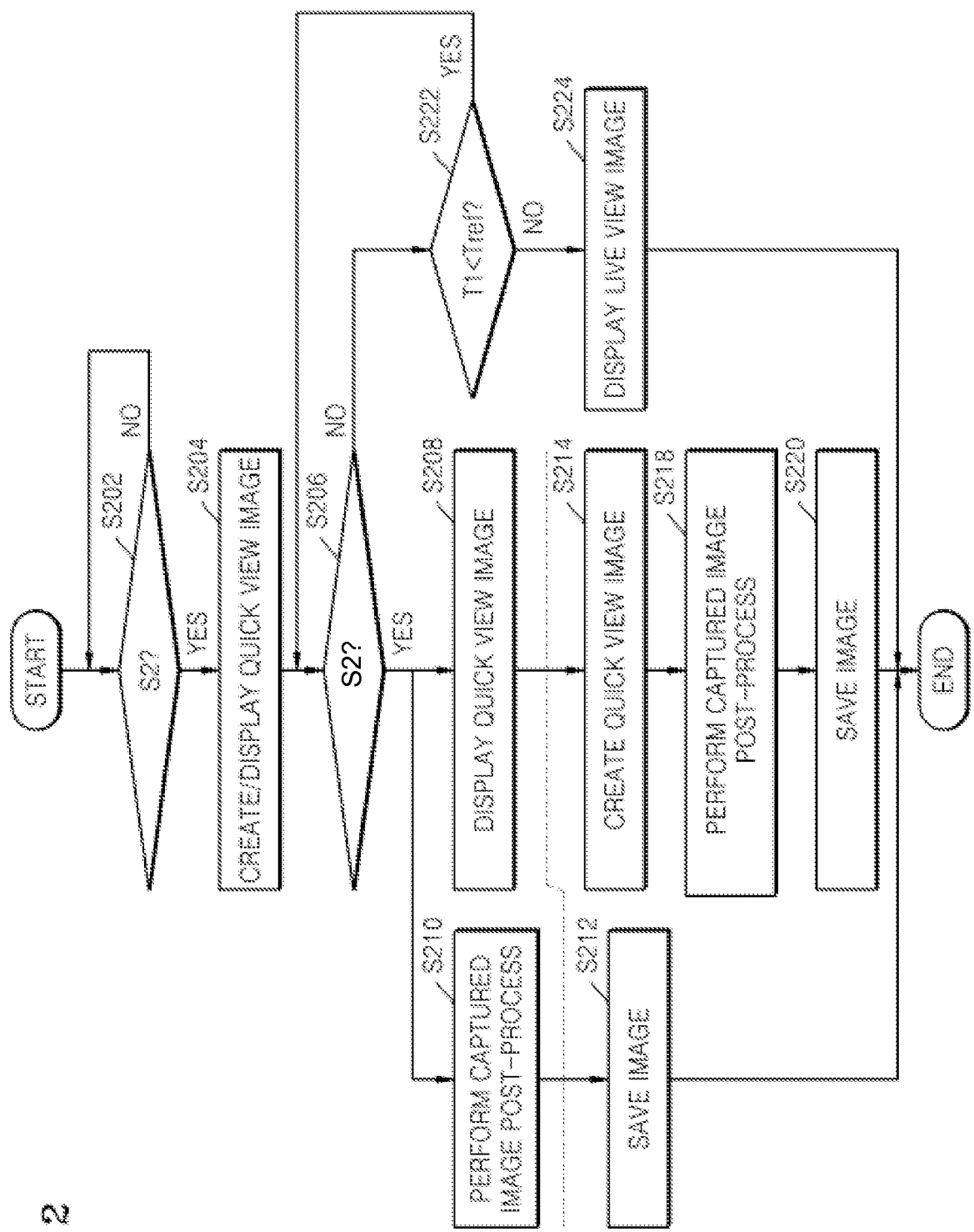
FIG. 2 is a flowchart illustrating a method for controlling the electronic device of FIG. 1, according to an embodiment.

FIG. 2 is a flowchart illustrating a method for controlling the electronic apparatus 100A according to an embodiment. Here, a first inputted shutter release signal is called a first shutter release signal, and a second inputted shutter release signal received is called a second shutter release signal.

To begin, once the first shutter release signal is inputted in operation 5202, a first quick view image corresponding to a first captured image is created and displayed in operation 5204. In order to create and display the first captured image as the first quick view image, there may be processes executed such as noise reduction and resolution adjustment, etc.

While the first quick view image corresponding to the first shutter release signal is being created or displayed, if the second shutter release signal is inputted in operation S206, after having displayed the first quick view image corresponding to the first shutter release signal in operation S208, then a second quick view image corresponding to the second shutter release signal is created and displayed in operation S214.

While the first quick view image corresponding to the first shutter release signal is being displayed in operation S208, a post-process is executed for the first captured image corresponding to the first shutter release signal in operation S210 as a parallel operation to S208. The post-process (S210) for the first captured image may include encoding the first captured image and creating a file. The post-process for the first captured image may be executed after completing the creation of the first quick view image, and in parallel with displaying the first quick view image. The post-process for the first captured image may further include various processes such as color interpolation, color adjustment, edge sharpening, or skin color adjustment. When the post-process for the first captured image is completed, the created image file is saved in the storage unit 150 in operation S212.

After creating the second quick view image corresponding to the second shutter release signal in operation S214, the post-process for the second captured image corresponding to the second shutter release signal is executed in operation S218. The post-process (S218) for the second captured image corresponding to the second release signal may be executed after completing the creation (S214) of the second quick view image corresponding to the second shutter release signal, and in parallel with displaying the second quick view image corresponding to the second shutter release signal. After the post-process for the second captured image corresponding to the second shutter release signal is completed, the image file for the second captured image corresponding to the second shutter release signal is saved in the storage unit 150 in operation S220.

If a third shutter release signal is inputted while creating or displaying the quick view image corresponding to the second shutter release signal, as described earlier, after completing creation of the second quick view image corresponding to the second release signal, the electronic apparatus 100A is ready to take a new image corresponding to the third shutter release.

If the third release signal is not inputted until finishing the display of the second quick view image corresponding to the second shutter release signal, then after completing the display of the second quick view image corresponding to the second shutter release signal, the live view image and OSD information may be displayed.

In operation S222, if the second shutter release signal is not inputted within a first reference time ($T_{ref}$) from the moment the first release signal was inputted ($T_1$ represents an amount of time passed since the moment the first release signal was inputted), the live view image and OSD information are displayed in operation S224 after finishing the display of the first quick view image corresponding the first shutter release signal.

Figure 3:
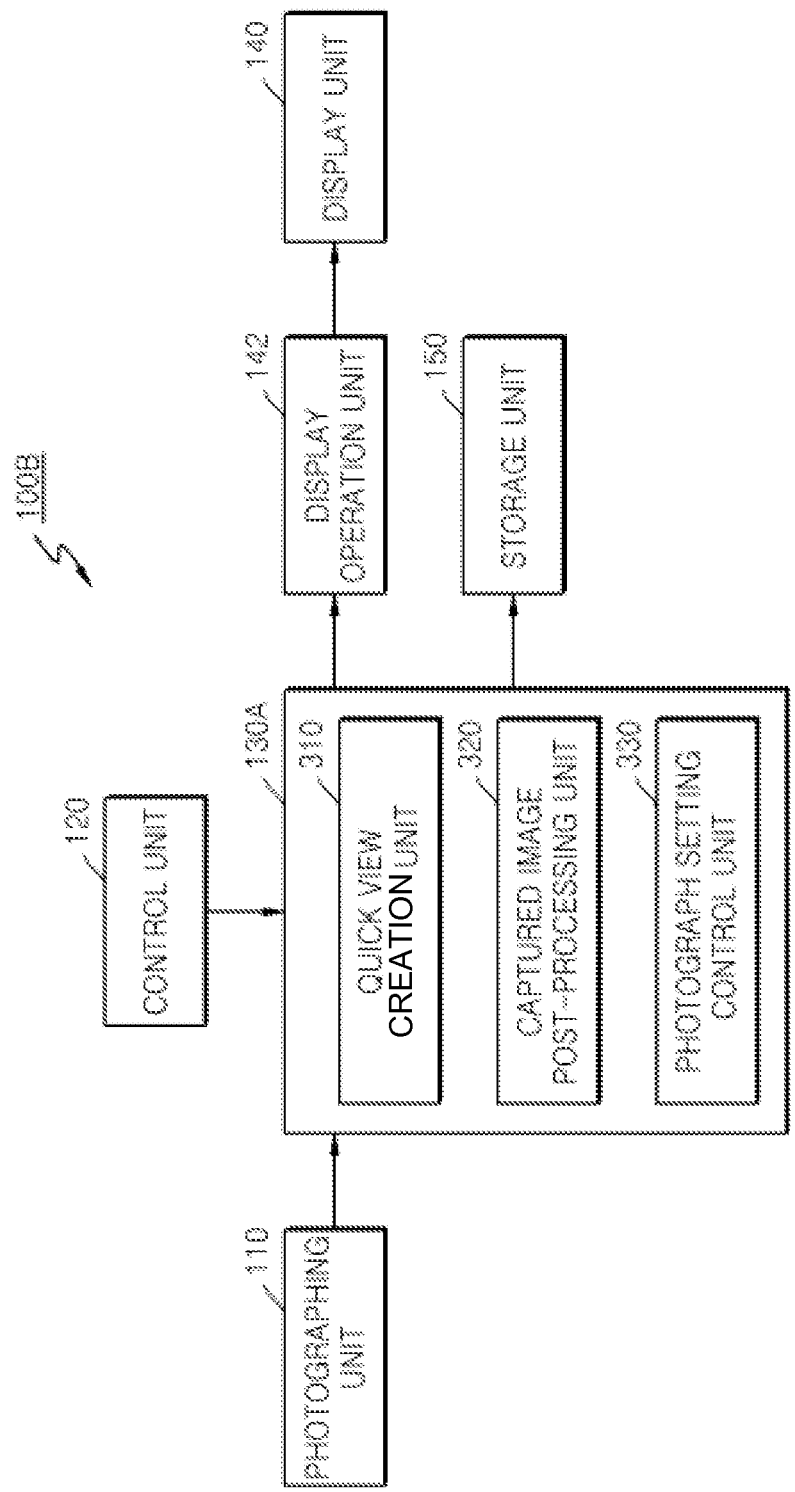
FIG. 3 is a block diagram illustrating a structure of an electronic apparatus according to another embodiment.

FIG. 3 is a block diagram illustrating a structure of an electronic apparatus 100B according to another embodiment. According to the present embodiment, the electronic apparatus 100B includes the photographing unit 110, the control unit 120, a processing unit 130A, the display unit 140, a display operation unit 142, and the storage unit 150. The processing unit 130A includes a quick view creation unit 310, a captured image post-processing unit 320, and a photograph setting control unit 330.

After a captured image corresponding to a shutter release signal is outputted from the photographing unit 110, the quick view creation unit 310 creates a quick view image corresponding to the captured image. When creating a quick view image, the quick view creation unit 310 may execute one or more processes such as a noise reduction process or resolution adjustment process. Also, the quick view creation unit 310 outputs the quick view image to the display operation unit 142, so that the quick view image may be displayed on the display unit 140 for a predetermined amount of time.

The captured image post-processing unit 320 executes a post-process for the captured image. The post-process for the captured image may include encoding the captured image and creating a file for the captured image; for example, the captured image post-processing unit 320 may encode the captured image into a Joint Photographic Expert Group (JPEG) compatible image file by following a JPEG standard. The captured image post-processing unit 320 may also execute various image processes such as color balancing, color adjustment, edge sharpening, and color-skin adjustment.

According to the present embodiment, the captured image post-processing unit 320 may execute processes in parallel with the quick view creation unit 310. For example, if there is no dependency between a first process of the captured image post-processing unit 320 and a second process of the quick view creation unit 310, the captured image post-processing unit 320 may execute the first process in parallel with execution of the second process by the quick view creation unit 310. For example, when creating a quick view image, the quick view creation unit 310 may use a same hardware block or resource as the captured image post-processing unit 320, and as a result, the captured image post-processing unit 320 may not execute the first process while the hardware block is executing the second process (e.g., the quick view image creation). However, while the quick view creation unit 320 is executing the quick view image display (e.g., after the creation of the quick view image), the captured image post-processing unit 320 may simultaneously execute the post-process for the captured image.

The photograph setting control unit 330 automatically controls the one or more photograph setting values based on a subject matter captured by the photographing unit 110. For example, the photograph setting control unit 330 may execute one or more processes such as auto focusing, auto exposure, and/or auto white balance based on the subject matter. The photograph setting control unit 330 receives the real-time image signal from the photographing unit 110 and a user's input from the control unit 120, and thereby may control the photograph setting values.

The display operation unit 142 receives the quick view image, the live view image, and a playback image from the processing unit 130A, and sends a display operation signal to the display unit 140. To provide one or more of these functions, the display operation unit 142 may include a scan drive unit, a data drive unit, or a timing control unit, etc.

Figure 4:
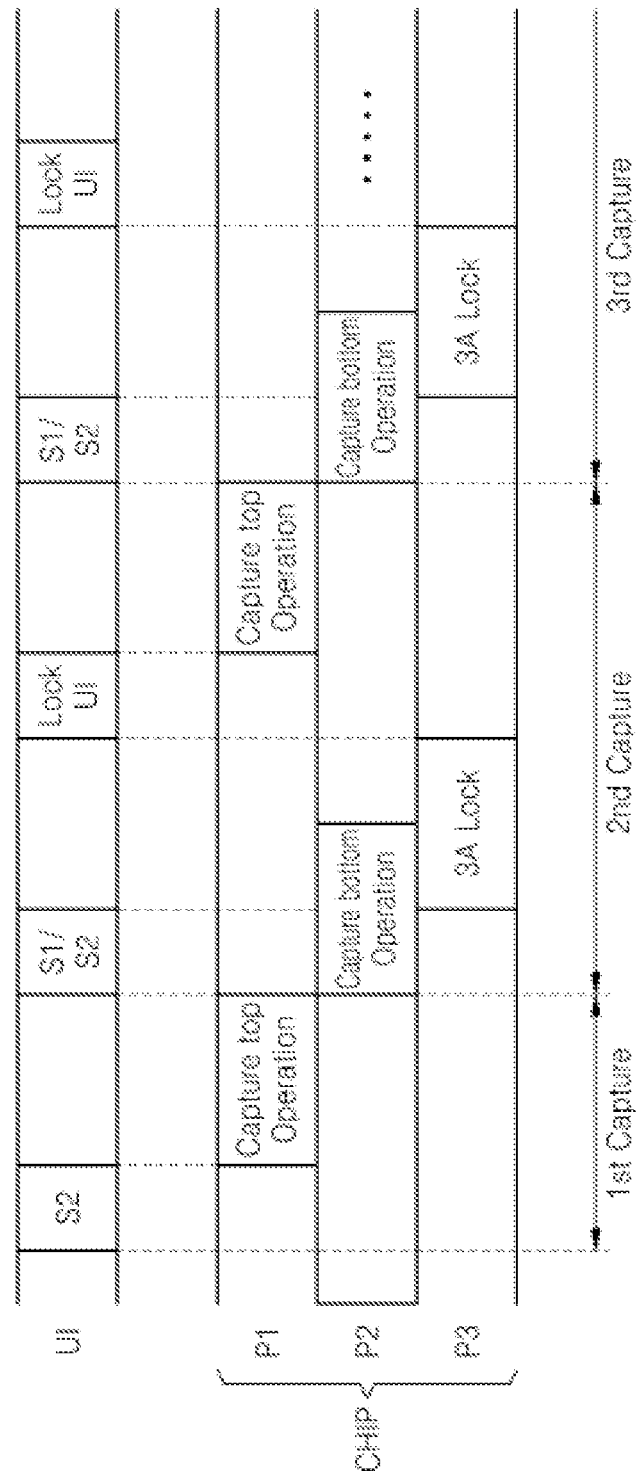
FIG. 4 is a timing chart illustrating operations of elements of a processing unit of the electronic apparatus of FIG. 3.

The following is a more detailed description of operations of elements of the processing unit 130A with reference to FIG. 4. FIG. 4 is one example of a timing chart illustrating the operations of elements of the processing unit 130A according to another embodiment. In FIG. 4, a UI represents a user interface process; P1 represents a process of the quick view creation unit 310; P2 represents a process of the captured image post-processing unit 320; P3 represents for a process of the photograph setting control unit 330. A user interface for the UI process may be provided by the control unit 120 and the display unit 140.

When a first shutter release signal is inputted, a first capture process starts. Once the first shutter release signal is inputted from the control unit 120, in the quick view creation unit 310, a first capture top operation is executed for a first captured image corresponding to the first shutter release signal. The first capture top operation is a process for creating a first quick view image for the first captured image.

If a second shutter release signal is inputted either before or at the same time the first capture top operation for the first shutter release signal is completed, a $2^{nd}$ capture process starts after finishing the first capture top operation corresponding to the first shutter release signal. When the $2^{nd}$ capture starts, the quick view creation unit 310 outputs the first quick view image corresponding to the first shutter release signal to the display operation unit 142 for display of the first quick view image at the display unit 140. Also, the captured image post-processing unit 320, in parallel with the display of the first quick view image, executes a first capture bottom operation which includes encoding the first captured image that corresponds to the first shutter release signal.

If, in parallel with the first capture bottom operation, a ready-to-photograph signal S1 and the second shutter release signal are inputted, the photograph setting control unit 330 tracks the subject matter from the real-time image signal from the photographing unit 110, then operates in a 3A Lock mode that automatically controls the photograph setting values (e.g., the autofocus, autoexposure, and white balance). Thus, having been ready to capture an image, the image is captured and a Lock UI mode is provided to disable the user's control of the user interface. The Lock UI mode may be provided as a black page, a stop page, etc. After the second image has been captured corresponding to the second shutter release signal, the quick view creation unit 310 executes a second capture top operation for the second captured image.

If a third shutter release signal S2 is inputted, either before or at the same time the second capture top operation for the second image is completed, a third capture may begin.

The present embodiment allows for a reduced amount of time required for the electronic apparatus 100B to get ready to take a new image after its previous one. Such merits come from, first, executing the capture bottom operation and controlling the photograph setting values (via the 3A Lock) in parallel, and second, enabling the user take a next image right after the capture top operation is completed.

Figure 5:
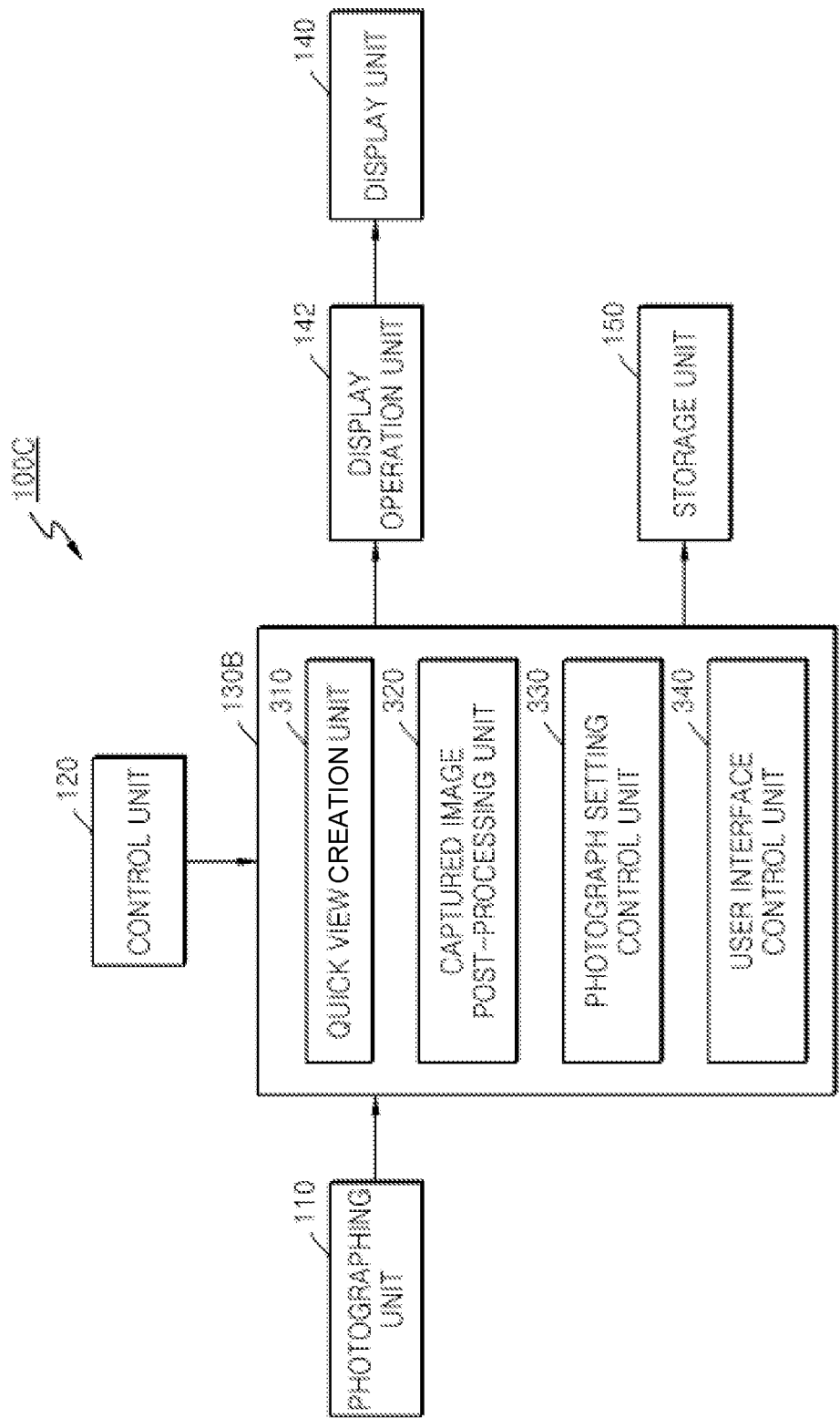
FIG. 5 is a block diagram illustrating a structure of an electronic apparatus according to another embodiment.

FIG. 5 is a block diagram illustrating a structure of an electronic apparatus 100C according to another embodiment. According to the present embodiment, a processing unit 130B includes the quick view creation unit 310, the captured image post-processing unit 320, the photograph setting control unit 330, and a user interface control unit 340.

The user interface control unit 340 provides and controls a user interface. The user interface may be provided through the display unit 140 in various forms such as a graphical user interface (GUI), sound, a guide lamp, etc. As described above with reference to FIG. 4, the user interface control unit 340 locks the user interface and displays a locked screen when image capturing is in operation. Furthermore, the user interface control unit 340 may control the user interface not to display the OSD information on the user interface in case two photographs are taken in a row in a very short amount of time, and thus a first quick view image corresponding to a first shutter release signal is directly followed by a second quick view image corresponding to a second shutter release signal.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

In the present specification of the invention (especially in the claims), the term "the" and any similar indicative words may be applicable for both singular and plural. Also, in case the invention used a range, the range has to be regarded to include inventions that have applied any individual element within the range (unless described otherwise), and it has to be regarded as having written in the detailed description of the invention each individual element included in the range. Lastly, if there is not any clear order or a counter order mentioned in this specification as to the steps of the operations according to a method of the invention, the operations may be processed in any proper order. In other words, the invention is not limited to the written order of operations of the present specification. Any example or exemplary words (e.g., for example, etc.) were used in this specification simply in order to describe the invention in detail, and therefore, do not limit the scope of the invention unless there is a limitation given in claims. Also, one of ordinary skill in the art may appreciate that the invention may be configured through various modifications, combinations, and changes according to design conditions and factors without departing from the spirit and technical scope of the invention and its equivalents.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus comprising:
   a photographing unit which converts incident light into electricity to create an image signal, and captures a first captured image corresponding to a first shutter release signal;
   a processing unit which creates a first quick view image of the first captured image and creates a live view image based on the image signal created by the photographing unit;
   a display unit which displays the first quick view image and the live view image;
   wherein the processing unit comprises:
      a quick view creation unit which creates the first quick view image corresponding to the first shutter release signal and executes a quick view image display of the first quick view image at the display unit, and
      a captured image post-processing unit which encodes the first captured image corresponding to the first shutter release signal after completion of the creating of the first quick view image corresponding to the first release signal, if a second shutter release signal is inputted within a first reference time from a moment at which the first shutter release signal is inputted;
   wherein, if the second shutter release signal is inputted within the first reference time from the moment at which the first shutter release signal is inputted, the quick view creation unit creates a second quick view image of a second captured image corresponding to the second shutter release signal after completion of the encoding of the first captured image corresponding to the first shutter release signal and executes a quick view image display of the second quick view image at the display unit, and
   if the second shutter release signal is not inputted within the first reference time from the moment at which the first shutter release signal is inputted, the processing unit creates the live view image and displays the live view image at the display unit, and
   while the quick view creation unit executes the quick view image display of the first quick view image, the captured image post-processing unit simultaneously executes a post-process for the first captured image.

2. The apparatus of claim 1, wherein the quick view creation unit displays the first quick view image corresponding to the first shutter release signal at the display unit while the first captured image is being encoded.

3. The apparatus of claim 2, wherein the processing unit further comprises a photograph setting control unit which automatically controls one or more photograph setting values based on a subject matter, after completion of the creating of the first quick view image corresponding to the first shutter release signal, if the second shutter release signal is inputted within the first reference time.

4. The apparatus of claim 3, wherein the quick view creation unit creates the second quick view image corresponding to the second shutter release signal, after completion of the encoding of the first captured image corresponding to the first shutter release signal and completion of the controlling of the one or more photograph setting values.

5. The apparatus of claim 4, wherein the processing unit further comprises a user interface control unit which sets a user interface to a locked mode while the photographing unit is capturing a second image corresponding to the second shutter release signal.

6. The apparatus of claim 2, wherein the captured image post-processing unit saves the first captured image corresponding to the first shutter release signal, after completion of the creating of the first quick view image corresponding to the first shutter release signal, if the second shutter release signal is inputted within the first reference time.

7. A method for controlling an electronic apparatus, the method comprising:
   capturing a first captured image corresponding to a first shutter release signal;
   creating a first quick view image corresponding to the first shutter release signal;
   displaying the first quick view image of the first captured image corresponding to the first shutter release signal;
   encoding the first captured image corresponding to the first shutter release signal after completion of the creating of the first quick view image corresponding to the first shutter release signal, if a second shutter release signal is inputted within a first reference time from a moment at which the first shutter release signal is inputted;
   creating a second quick view image of a second captured image corresponding to the second shutter release signal after completion of the encoding of the first captured image corresponding to the first shutter release signal and displaying the second quick view image, if the second shutter release signal is inputted within the first reference time from the moment at which the first shutter release signal is inputted;
   displaying a live view image, if the second shutter release signal is not inputted within the first reference time from the moment at which the first shutter release signal is inputted; and
   while displaying the first quick view image, simultaneously executing a post-process for the first captured image.

8. The method of claim 7, further comprising:
displaying the first quick view corresponding to the first shutter release signal, while the encoding of the first captured image is in operation.

9. The method of claim 8, further comprising automatically controlling one or more photograph setting values, based on a subject matter, in parallel with the encoding of the first captured image, after completion of the creating of the first quick view image corresponding to the first shutter release signal, if the second shutter release signal is inputted within the first reference time.

10. The method of claim 9, further comprising creating the second quick view image corresponding to the second shutter release signal, after completion of the encoding of the first captured image corresponding to the first shutter release signal and completion of the controlling of the one or more photograph setting values.

11. The method of claim 10, further comprising setting a user interface to a locked mode while the first captured image corresponding to the shutter release signal is being captured.

12. The method of claim 8, further comprising saving the first encoded captured image corresponding to the first shutter release signal, after completion of the creating of the first quick view image corresponding to the first shutter release signal, if the second shutter release signal is inputted within the first reference time.

13. A non-transitory computer-readable recording medium having stored thereon computer program codes, which when executed by a processor, performs a method for controlling an electronic apparatus,
wherein the electronic apparatus captures images corresponding to shutter release signals, and
wherein the method for controlling the electronic apparatus comprises:
capturing a first captured image corresponding to a first shutter release signal;
creating a first quick view image corresponding to the first shutter release signal;
displaying the first quick view image of the first captured image corresponding to the first release signal;
encoding the first captured image corresponding to the first shutter release signal after completion of the creating of the first quick view image corresponding to the first shutter release signal, if a second shutter release signal is inputted within a first reference time from a moment at which the first shutter release signal is inputted;
creating a second quick view image of a second captured image corresponding to the second shutter release signal after completion of the encoding of the first captured image corresponding to the first shutter release signal and displaying the second quick view image, if the second shutter release signal is inputted within the first reference time from the moment at which the first shutter release signal is inputted;
displaying a live view image, if the second shutter release signal is not inputted within the first reference time from the moment at which the first shutter release signal is inputted; and
while displaying the first quick view image, simultaneously executing a post-process for the first captured image.

14. The non-transitory computer-readable recording medium of claim 13, wherein the method for controlling the electronic apparatus further comprises:
displaying the first quick view corresponding to the first shutter release signal, while the encoding of the first captured image is in operation.

15. The non-transitory computer-readable recording medium of claim 14, wherein the method for controlling the photographing apparatus further comprises automatically controlling one or more photograph setting values, based on a subject matter, in parallel with the encoding of the first captured image, after completion of the creating of the first quick view image corresponding to the first shutter release signal, if the second shutter release signal is inputted within the first reference time.

16. The non-transitory computer-readable recording medium of claim 15, wherein the method for controlling the photographing apparatus further comprises creating the second quick view image corresponding to the second shutter release signal, after completion of the encoding of the first captured image corresponding to the first shutter release signal and completion of the controlling of the one or more photograph setting values.

17. The non-transitory computer-readable recording medium of claim 16, wherein the method for controlling the photographing apparatus further comprises setting a user interface to a locked mode while the first captured image corresponding to the shutter release signal is being captured.

18. The non-transitory computer-readable recording medium of claim 14, wherein the method for controlling the photographing apparatus further comprises saving the first encoded captured image corresponding to the first shutter release signal, after completion of the creating of the first quick view image corresponding to the first shutter release signal, if the second shutter release signal is inputted within the first reference time.

* * * * *